US006890255B2

(12) United States Patent
Jarvis et al.

(10) Patent No.: US 6,890,255 B2
(45) Date of Patent: May 10, 2005

(54) MULTIPLE WHEEL ROULETTE GAME

(75) Inventors: Eugene Jarvis, Park Ridge, IL (US); Andrew Eloff, Evanston, IL (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/319,774

(22) Filed: Dec. 13, 2002

(65) Prior Publication Data

US 2004/0077398 A1 Apr. 22, 2004

Related U.S. Application Data

(60) Provisional application No. 60/341,548, filed on Dec. 17, 2001.

(51) Int. Cl.[7] ................................................ A63F 13/00

(52) U.S. Cl. .......................................... 463/17; 463/20

(58) Field of Search .............................. 463/16–20, 21, 463/25, 29

(56) References Cited

U.S. PATENT DOCUMENTS 3,819,186 A 6/1974 Hinterstocker
4,260,159 A * 4/1981 Hoffman ...................... 463/22
4,732,386 A 3/1988 Rayfiel
4,836,546 A * 6/1989 DiRe et al. ................... 463/18
4,941,665 A 7/1990 Klamer
5,184,821 A 2/1993 Korenek
5,259,616 A 11/1993 Bergmann
5,540,442 A 7/1996 Orselli et al.
5,584,763 A 12/1996 Kelly et al.
5,636,838 A 6/1997 Caro
5,639,089 A 6/1997 Matsumoto et al.
5,722,891 A 3/1998 Inoue
5,725,428 A 3/1998 Achmüller
5,755,440 A 5/1998 Sher
5,848,932 A 12/1998 Adams
5,882,261 A 3/1999 Adams
5,890,962 A 4/1999 Takemoto
5,934,999 A * 8/1999 Valdez ........................ 463/17
6,083,105 A 7/2000 Ronin et al.
6,093,101 A 7/2000 Mourad
6,105,962 A 8/2000 Malavazos et al.
6,113,098 A 9/2000 Adams
6,120,378 A 9/2000 Moody et al.
6,162,121 A 12/2000 Morro et al.
6,186,894 B1 2/2001 Mayeroff
6,209,869 B1 * 4/2001 Mathews ................ 273/138.1
6,217,022 B1 4/2001 Astancha
6,224,483 B1 5/2001 Mayeroff
6,227,542 B1 5/2001 Cosmi
6,227,971 B1 5/2001 Weiss
6,336,863 B1 1/2002 Baerlocher et al.
6,364,314 B1 4/2002 Canterbury
6,398,220 B1 6/2002 Inoue
2001/0003709 A1 6/2001 Adams
2001/0005690 A1 * 6/2001 Boulton ....................... 463/17
2002/0169017 A1 * 11/2002 Visoenik ...................... 463/17
2003/0050110 A1 * 3/2003 Wichinsky .................. 463/17

OTHER PUBLICATIONS

American Bandstand Brochure written by Anchor Games, published in 2001.

(Continued)

*Primary Examiner*—John M. Hotaling, II
(74) *Attorney, Agent, or Firm*—Bell Boyd & Lloyd LLC

(57) ABSTRACT

An electronic game, and a method for playing the same, that enables a player to bet on multiple roulette wheels simultaneously. In addition, multiple pay lines, which provide for multiple winning numbers per roulette wheel, can be selected so as to provide for higher stakes and increased betting combinations. In order to play the game, a computing device is provided having, among other things, a video or electronic screen display on which multiple roulette wheels or their simulations, multiple winning numbers and/or betting areas are displayed. The computing device also includes a selection device that provides a means for the player to interact with the computing device to select bets and wager amount. Upon completion of the game, the computing device calculates the outcome of the game and adjusts the player's credit balance.

38 Claims, 9 Drawing Sheets

OTHER PUBLICATIONS

Blurring the Green–Felt Line, written by International Gaming & Wagering Business, published in Jan., 2003.
Bonus Roulette Brochure written by R. Franco, not dated.
Buck's Roulette Brochure written by R. Franco, not dated.
Classic Pot of Gold Brochure written by Ace Coin Equipment Ltd., not dated.
Cyberdyne Gaming Brochure written by Cyberdyne Gaming, not dated.
Elvis Hits Advertisement written by IGT, published in 1999.
Live Random Dice Machines, written by General Automatic Amusement, not dated.
Lucky Dolls, written by Strictly Slots, published in May 2002.
Mistress of the Dark™ Advertisement written by IGT, published in 2002.
Monte Carlo advertisement, written by Bally Gaming, Inc., published in 2002.
Odds On Gaming™, Inc. brochure, published by Odds on Gaming, not dated.
Pick a Prize Brochure written by Acres Gaming Incorporated, published prior 2001.
R&B™ Brochure published by AC Coin & Slot, not dated.
Rapid Roulette™ written by John Huxley Ltd., published in 2002.
Roulette Grand Jeu brochure, written by Amatic Industries, not dated.
Roulette written by Atronic Casino Technology, published in 1999.
Royal Roulette advertisement written by Barcrest Games, not dated.
Royal Roulette Brochure written by Impulse Gaming Ltd., not dated.
Silver City Roundup Brochure published by AC Coin & Slot, not dated.
Slot Machine Buyer's Handbook, A Consumer's Guide to Slot Machines written by David L. Saul and Daniel R. Mead, published in 1998.
Slot Machines and Coin–Op Games written by Bill Kurtz, published in 1997.
Slot Machines on Parade, 1st edition written by Robert N. Geddes and illustrated by Daniel R. Mead, published in 1980.
Slot Machines written by Marshall Fey, published in 1983, 1989, 1991, 1994, 1997.
Take Your Pick Article written by Strictly Slots, published in Mar. 2001.
Technique of Victory, written by Odrex, not dated.

* cited by examiner

MULTIPLE WHEEL ROULETTE GAME

This application claims priority based upon U.S. Provisional Patent Application Ser. No. 60/341,548 filed Dec. 17, 2001.

FIELD OF THE INVENTION

This invention relates generally to a game, and more particularly to an electronic game that simulates the game of roulette, and still more particular to an electronic roulette game that provides a player the opportunity to play multiple roulette wheels simultaneously, make the same betting choice for all wheels and/or select multiple winning numbers for each wheel.

BACKGROUND OF THE INVENTION

Roulette is a game of chance that has been played, it is believed, in various forms since the $18^{th}$ century. Traditional roulette is played in casinos on a table, wherein the wheel is set near the middle of the table. The outer wheel area is divided into 37 spaces in Europe and 38 spaces in the United States. Each space has outer walls defining sectors, so that the ball can come to rest within a sector after the wheel stops spinning. The sectors alternate between the color red and the color black and are numbered from 1 to 36. There is also a 0 (green or white) and a 00 (in the United States version).

The table includes a roulette betting felt configuration for making betting selections which has, among other things, numbered red and black squares corresponding to the wheel for placing bets on the outcome of the resting place of the ball after the wheel stops spinning. A "winning number" is the outcome of the roulette wheel in the form of one of the numbers selected by the roulette wheel—regardless of whether it matches the player's wager. A "winning bet" occurs when the player's selection (or bet) includes a "winning number".

As indicated above, certain of the numbers and spaces on the roulette betting felt (such as 2, 4, 6, 8, 10, 11, 13, 15, 17, 20, 22, 24, 26, 28, 29, 31, 33, and 35) are colored black, while others (such as 1, 3, 5, 7, 9, 12, 14, 16, 18, 19, 21, 23, 25, 27, 32, 34 and 36) are colored red. Also included on the betting felt are spaces for such bets as: "manqué" (1 to 18 inclusive); "passé" (19 to 36 inclusive); "pair" (an even number); "impair" (an odd number); "rouge" (a red number); and "noir" (a black number). Therefore, the winning bet may be comprised of a bet on the particular winning number, a bet on a range of numbers that includes the winning number (e.g., on odd or the "$2^{nd}$ 12"), or a bet on a color that includes a winning number.

All bets are placed against the house and are indicated by placing stakes (e.g., chips) on the particular numbers or types of bets selected as they appear on the table. Once the bets are placed, the "croupier" spins the wheel in one direction and tosses the ball onto the wheel in the other direction. The sector where the ball finally comes to rest is the outcome, thereby indicating the winning number and color. This information is then used to manually determine which of the bets are winning bets. Various betting combinations with different odds and maximum bets are allowed depending on the rules of the gaming establishment. The standard odds and payouts for traditional roulette are well known in the art.

While roulette may be played in, among other places, most casinos, traditional versions of roulette are somewhat slow moving and hence can be lacking in player interest. Several prior art games have attempted to provide interesting variations on conventional roulette.

U.S. Pat. No. 6,209,869 to Mathews discloses an apparatus and method for playing a roulette-type game. The apparatus includes a conventional roulette wheel and four tables. Each table has a lower playing field and an upper playing field, wherein each field is utilized for placing bets. During play, four balls are utilized on the one wheel, wherein each ball corresponds to one of the tables. The lower field is utilized for placing bets on the single ball that is associated with that particular table, while the upper field of each table is utilized for placing bets on all of the balls in play.

U.S. Pat. No. 5,259,616 to Bergmann discloses a coin-operated gaming machine that has a roulette-like number pan and a setting keyboard. In operation, the player inserts one or more coins into a coin insertion slot. The player then selects which numbers the player wishes to bet on using the keyboard. After the player places a bet, a random number generator randomly determines the winning number, and that number is then highlighted on the number pan. The random number generator also randomly determines a win multiplier number by which the winning payout is multiplied.

U.S. Pat. No. 6,083,105 to Ronin et al. discloses a single-player computerized roulette playing apparatus. The apparatus includes a rotatable roulette wheel that is mechanically rotated using a drive mechanism. One or more balls are put into play during the game. A roulette game field is displayed on a corresponding computer display, which provides a means by which the player can place one or more bets.

U.S. Pat. No. 5,755,440 to Sher relates to an apparatus used to play roulette using multiple balls. The apparatus includes a single roulette wheel that has multiple tracks, thereby permitting two or more balls to be propelled into the wheel simultaneously.

Additionally, video slots and poker games have provided jackpots comprising larger than normal payoffs and/or progressive payoffs, which are based on the performance of more than one machine which can be linked together—in an attempt to generate more interest and a perception of greater rewards. However, these previously devised games do not provide the ability to play a great number of games in a short amount of time—something that is increasingly important in a casino environment.

Indeed, there is a constant need in the gaming industry to devise new games that keep players interested to substantially reduce the possibility that players will cease playing or reduce the amount that they play due to a perceived lack of interest or challenge. Moreover, it is desirable to provide new or different variations of existing, familiar games so as to overcome any reluctance to play and possibly lose at games with unfamiliar rules or strategies.

Therefore, it is an object of the present invention to provide an electronic game that captures the excitement of casino-style roulette, while providing the opportunity to bet on multiple wheels simultaneously and/or provide multiple winning numbers for each roulette wheel displayed.

It is a second object of the present invention to provide a roulette-type game that provides progressive or high jackpot betting opportunities so as to provide maximum interest to roulette or other wagering game players.

It is a further object of the present invention to provide a roulette game that can be played in the form of a video slot machine in order to conserve valuable casino floor space, and minimize game acquisition and operating costs.

It is another object of the present invention to provide a roulette game that automatically determines which wagers are winning bets and recalculates a player's remaining credits based on the outcome so as to minimize the calculations which must be performed by the player, and minimize the use of casino employees.

It is yet another object of the present invention to provide a roulette-based game that can be implemented on a video gaming machine in a casino for gambling purposes.

A still further object of the present invention is to provide an electronic roulette-based game that is easy and economical to manufacture.

SUMMARY OF THE INVENTION

The above and other objects, features and advantages of the invention will become readily apparent from the following detailed description thereof, which is to be read in connection with the accompanying drawings.

The above-listed objects are met or exceeded by the present electronic game wherein an electronic video roulette game is provided having at least two wheels having multiple numbers for providing an outcome. The electronic game may be played by at least one player who makes at least one selection or bet and seeks a payout when the selection includes a winning number. In order to provide visual stimulation and to emphasize the random nature of the number generation, the wheels are spun or made to appear to spin during the process of randomly picking the winning numbers.

The game comprises: a video or electronic display for displaying the video game; an input means, such as a touch screen, roller ball, touch pad, mouse, push buttons, or the like, operably associated with the electronic display for entering the individual number or other betting selections by the player; a microprocessor for controlling the game; means for randomly generating the outcome of the at least two roulette wheels; at least one indicator (e.g., a pay line) to show the outcome of the roulette wheels; and, means for computing the payout based on the outcome. The electronic display may include a roulette betting felt layout for making the betting selections.

The game can further include multiple winning numbers per roulette wheel and/or means for wagering on the roulette wheels. Using either multiple wheels and/or multiple winning numbers per wheel results in multiple winning numbers and, depending on the bets which were placed, possibly multiple winning bets. The wagering means can further include means for wagering on multiple roulette wheels by making a single betting selection.

The game may also feature a bonus, jackpot, progressive, or other special payout that may be awarded when the outcome includes a particular winning number or a winning number that is repeated a selected number of times on different wheels. For example, a special payout could be made if the same number appeared three times on five roulette wheels. The special payout could be further constrained to three adjacent wheels having the same number, or perhaps only the first three wheels. By making it practical for a player to play one or more roulette games simultaneously, the invention allows the creation of these special wheel combination payouts.

Unlike such conventional, mechanical-type roulette wheels, the present invention allows roulette to be played in a much smaller space. In fact, it enables the game to be played in the form of a standard slot machine. Moreover, with the present invention, the player can play many wheels at once—unlike conventional roulette games where at most it is feasible to play one or two roulette wheels at the same time. The present invention is also much more likely to be lower in cost and maintenance when compared with roulette games that depend on mechanical wheels.

A method is also provided for playing roulette on one or more roulette wheels having numbers for producing an outcome, wherein the method comprises the steps of: selecting the roulette number or combination of numbers to be played (e.g., the first twelve numbers or all black numbers); selecting the number of roulette wheels to be played; selecting the number of winning numbers per wheel; wagering on the selections; determining the outcome of the roulette wheels; and computing the amount of the payout based on the outcome.

Wagering is made on multiple roulette wheels by placing a single wager. The player chooses the wager amount, the number of wheels to play and the number of winning numbers per wheel. Hence, the number of wheels being played and the number of winning numbers per wheel multiplies the amount wagered. For example, if five wheels are played (each having two winning numbers per wheel), a total of ten winning numbers are chosen each game, with the player betting ten times the wager on each roulette game. As a result, the game is fast moving for the player and generates greater revenue for the casino, as compared to traditional roulette.

In play, the wheels are spun and, when the winning number(s) is decided for each wheel, the wagers are settled between the house and player. The wheels can be represented on the electronic or video screen as traditional looking roulette wheels or as any other numerical representation of the random choice of thirty-eight numbers in the case of a United States wheel and thirty-seven numbers in the case of a European wheel. A bonus payout may be provided when the outcome includes a number selection which is repeated a selected number of times as a winning number and winning bet.

The preferred embodiment utilizes video slot machine wheels or reels to represent at least two roulette wheels wherein each wheel has the thirty-seven or thirty-eight number positions of a traditional roulette wheel. In operation, the wheels are spun and the winning numbers are determined by the roulette numbers that stop at the indicator or pay line position designated on the video slot machine wheel. By activating multiple pay lines, multiple winning numbers can be chosen on each video roulette wheel. Another embodiment of the invention utilizes electromechanical slot machine wheels as a roulette wheel analog that would operate the same as the video slot machine wheels in the preferred embodiment.

As indicated above, the roulette wheels also can be represented by graphic representations of roulette wheels having multiple numbered slots on a video or electronic screen, wherein the winning number is indicated by the representation of a ball landing in the slot of the winning number. More than one winning number per roulette wheel is indicated by the representation of multiple balls falling into a number of winning number slots.

Thus, this invention brings the excitement of traditional roulette to an electronic video game. Moreover, excitement to the player and revenue generation to the gaming establishment are increased because the player can play multiple wheels simultaneously, with a single betting choice being used for all the wheels being played. Moreover, multiple winning numbers per wheel can be used. Accordingly, the amount wagered is multiplied by the number of wheels that are in play, as well as the number of winning numbers per wheel.

DETAILED DESCRIPTION

Figure 1:
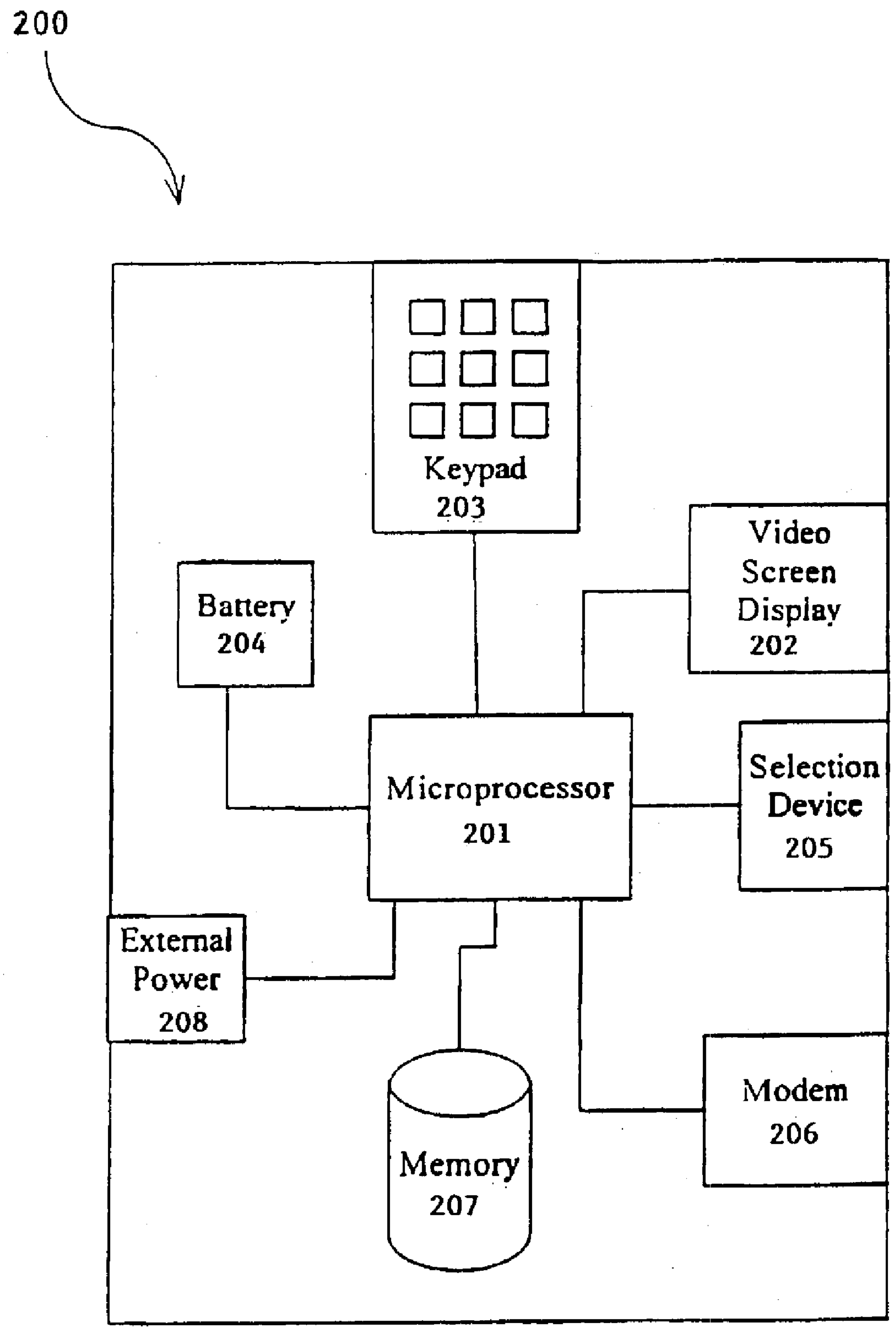
FIG. 1 is a schematic diagram of a computing device of the present invention.

While this invention is susceptible of embodiment in many different forms, there is shown in the drawings and will herein be described in detail, one or more specific embodiments with the understanding that the present disclosure is to be considered merely an exemplification of the principles of the invention and the application is limited only to the appended claims.

Referring to the drawings in detail, and initially to FIG. 1 thereof, a gaming device 200 according to a first embodiment of the present invention is shown. While the game of the present invention can be played on any electronic computing device, it is preferably played in a casino as a video gaming machine for gambling purposes. Alternatively, it can be played on a computer as an on-line gambling game over the Internet as part of a Wide Area Network ("WAN"), as part of a Local Area Network ("LAN"), and/or on a stand-alone computer.

It is also appreciated that another embodiment of the present invention involves using multiple concentric table-top roulette wheels. In this embodiment, a player may place a bet that covers one of the individual roulette wheels or all of the roulette wheels. It is further appreciated that multiple balls may be used on each roulette wheel, thereby increasing the number of winning numbers available per roulette wheel. Thus, the level of excitement is substantially increased from the standard roulette game.

FIG. 1 is a schematic diagram of a computing or gaming device 200 with which the present game is implemented. The gaming device 200 includes a microprocessor 201 for executing one or more programs stored in the device's memory 207, a video or electronic screen display 202, a selection device 205 for providing a means by which the player interacts with the gaming device 200, and an external power supply 208 and/or a battery 204 in electrical communication with each of the above-noted components for providing electrical power thereto. The memory 207, electronic screen display 202, and selection device 205 are each in communication with the microprocessor 201.

The selection device 205 may include but is not limited to a keypad, a peripheral device such as an external keyboard or mouse, and/or a plurality of function specific buttons. In the preferred embodiment, the electronic display screen 202 is a touch screen that serves as both the selection device 205 and the electronic screen display 202. In this embodiment, the selection device 205 includes "interactive" icons that appear on the electronic screen display 202. When the player touches the electronic screen display 202 at the location where an "interactive" icon of the type generally known in the prior art is displayed, this has the same effect as if the player were pushing a conventional electromechanical keypad button. Gaming device 200 can also include a credit card terminal, card reader or other such device for receiving payment, charging the player or tracking the player's gaming activity.

In the preferred embodiment, as shown in FIGS. 3 through 9, the roulette wheels are represented by a graphical representation of a series of slot machine wheels. As explained in more detail below, this embodiment may also include multiple pay lines to indicate the winning numbers and to modify the odds of winning. Alternatively, graphical representations of roulette wheels can be used. Likewise, electromechanical slot machine reels can also be used to represent and randomly select the winning numbers. Slot machine slots can also be used to signify the winning numbers.

Figure 2:
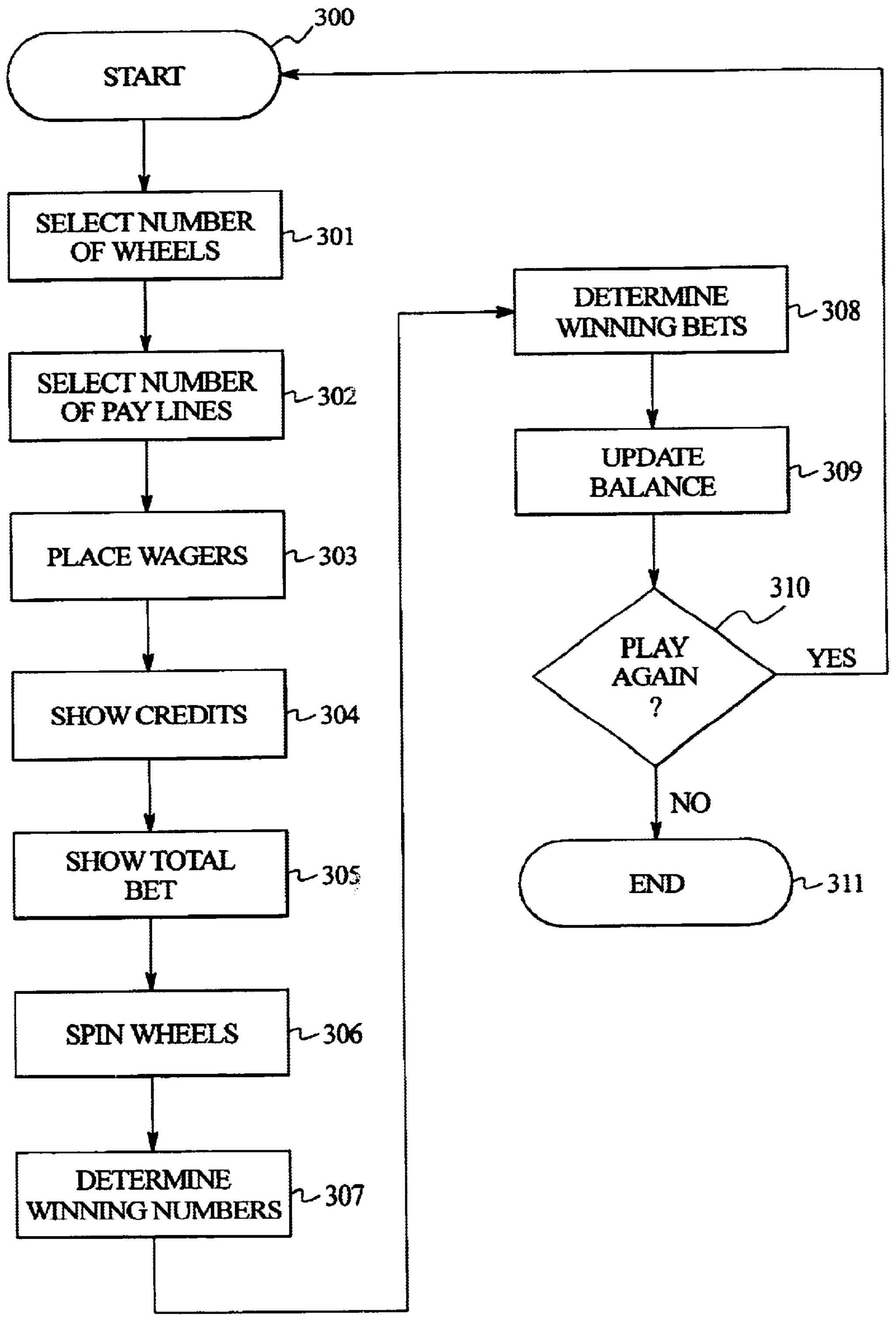
FIG. 2 is a flow chart diagram of an example of the steps involved in participating in a round of play of the present invention.

Referring to FIG. 2, a simplified flow diagram illustrating an example of the steps involved in participating in a round of play is shown. Play can be initiated in step 300 by inserting coins, paper currency, tokens, a debit card, a credit card, a smart card or the like to activate device 200 and provide the requisite payment arrangements. In a preferred embodiment, the player buys a number of credits before starting to play the game. If the player does not have a sufficient number of credits, the computing device prompts the player to insert more credits before allowing play to continue.

Figure 3:
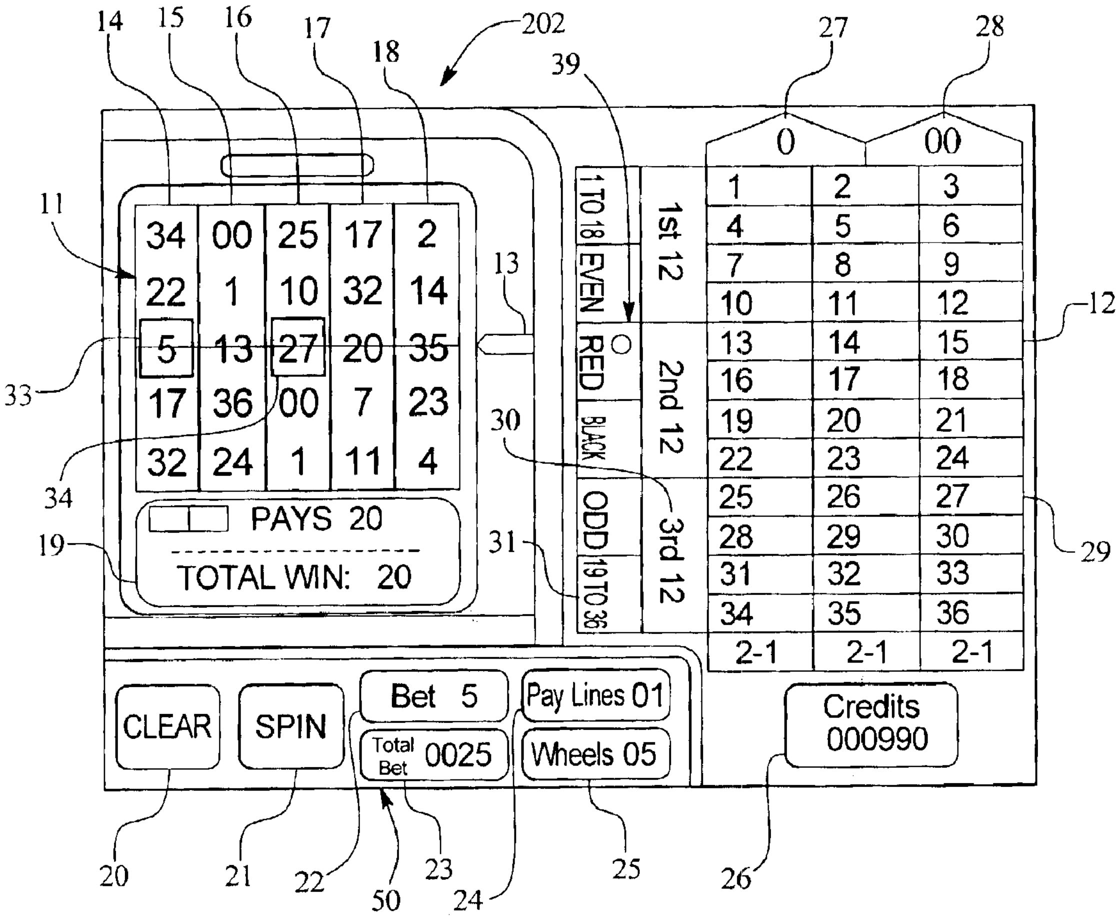
FIG. 3 is an illustration of a screen display showing, among other things, the winning numbers for five roulette wheels with one pay line.

After initiating the start of the game, the number of roulette wheels to be played is selected in step 301 through the use of the wheel number selector 25 (shown in FIG. 3). Selecting multiple wheels serves to result in multiple winning numbers, and depending on the bets that have been placed, multiple winning bets. While in the examples shown and disclosed, the maximum number of wheels is five, it is appreciated that other embodiments may include any number of multiple wheels and not depart from the scope of the present invention. In addition to selecting the number of wheels, the player may also select the number of pay lines in step 302 through the use of the line selector 30 (shown in FIG. 3). Selecting more than one pay line serves to create multiple winning numbers per wheel, hence multiplying the number of winning numbers, and increasing the likelihood of having multiple winning bets. While the illustrated embodiment allows up to a maximum number of five pay lines, it is appreciated that other embodiments may include any number of pay lines and not depart from the scope of the present invention.

Wagers are then placed in step 303 through the use of the bet selector 22 (shown in FIG. 3). In order to keep the player apprised of the available credit, the player's current balance may be shown in the credit display 26 in step 304. Once the wagers are placed, the total bet is calculated based on the number of wheels, pay lines and wagers and shown in the bet display 23 in step 305. In particular, the total bet comprises the amount wagered multiplied by the number of active wheels multiplied by the number of pay lines selected. The increase in the number of wheels and pay lines available can create more excitement and wagering by the players. As a result, potential casino revenue is increased over standard roulette play and wagering. While it is preferred that the same bet amount by applied to all wagers, it is appreciated that different bet amounts may be applied to different wagers and not depart from the scope of the present invention.

The selected numbers of wheels then are spun or made to appear to "spin" in step 306 by the operating system of microprocessor 201. A random number generator using a random function is used in step 307 to determine which of the possible roulette wheel numbers are selected as potential winning numbers (i.e., the number of wheels multiplied by the number of pay lines). The microprocessor also computes and controls the display of the possible winning numbers and determines which of the winning numbers comprise winning bets in step 308. Once it is determined whether any of the bets comprise winning bets, the balance in the player's account is updated accordingly in step 309. Likewise, the microprocessor and the software contained therein serve to compute and display the total bet, the credits, the remaining credits and all such numerical operations. Upon completion of the gaming activity, the device will display a message in step 310 inquiring whether it is desired to play another game. Otherwise, the game will end in step 311.

Referring now to FIGS. 3 though 9, the results of a series of different games having varying wagers, numbers of wheels and pay lines are shown. As shown in FIG. 3, the electronic screen display 202 preferably includes a wheel portion 11; a betting field 12; bet input and display portion 50; game buttons 20 and 21; and a total available balance display 26. The betting field 12 includes the possible bets available. In the example shown in the Figures, bets may be placed on: one or more specific numbers 1–36 (29), 0 (27) and/or 00 (28); particular numeric sections such as the "1$^{st}$ 12" numbers, the "2$^{nd}$ 12" numbers, and/or the "3$^{rd}$ 12" numbers (30); additional numeric sections such as "1 to 18" and/or "19 to 36" (31); even and/or odd numbers; and, red and/or black (39).

Wheel portion 11 shows five roulette wheels in play (14–18). The bet input and display portion 50 may include various displays including, but not limited to, displays for the number of pay lines selected 24, the number of wheels selected 25, the individual wager or bet amount 22 and the total bet 23, In the embodiment shown in the screen display in FIG. 3, the player has bet five credits, as shown in display 22, on each of five roulette wheels (14–18), as shown in display 25. A single pay line 13 was selected as shown in display 24. Accordingly, the total bet (as calculated by multiplying the wager (five credits) times the number of wheels (five) times the number of pay lines (one)), as shown in display 23, is twenty-five credits.

Game buttons 20 and 21 may be used to allow for the game to be cleared or played. In particular, clear button 20 may be touched, depressed or otherwise activated in a known way to clear, among other things, the results and/or all existing bets. Similarly, spinning of the wheels (14–18) may be initiated by touching, depressing or otherwise activating the spin button 21 in a known way.

In FIG. 3, the outcome of the spinning of five wheels with one pay line selected is shown. The potential winning numbers are those along pay line 13, namely 5, 13, 27, 20 and 35. Because five credits were bet on red, any red number landing along the pay line after the wheels are spun would be a winning number. In the present example, the payoff for a "red" bet is 2 for 1. As the wager was five credits, each red number would therefore pay ten credits. In this case, wheels 14 and 16 hit pay line 13 with 5 (33) and 27 (34), both of which are "red" numbers, so as to pay two times ten, or twenty credits, as shown in display 19. Because the player bet twenty-five credits and received a payoff of only twenty credits, the result was a net loss of five credits. Five credits are therefore subtracted from the total credits to yield 990 credits as shown in display 26.

Figure 4:
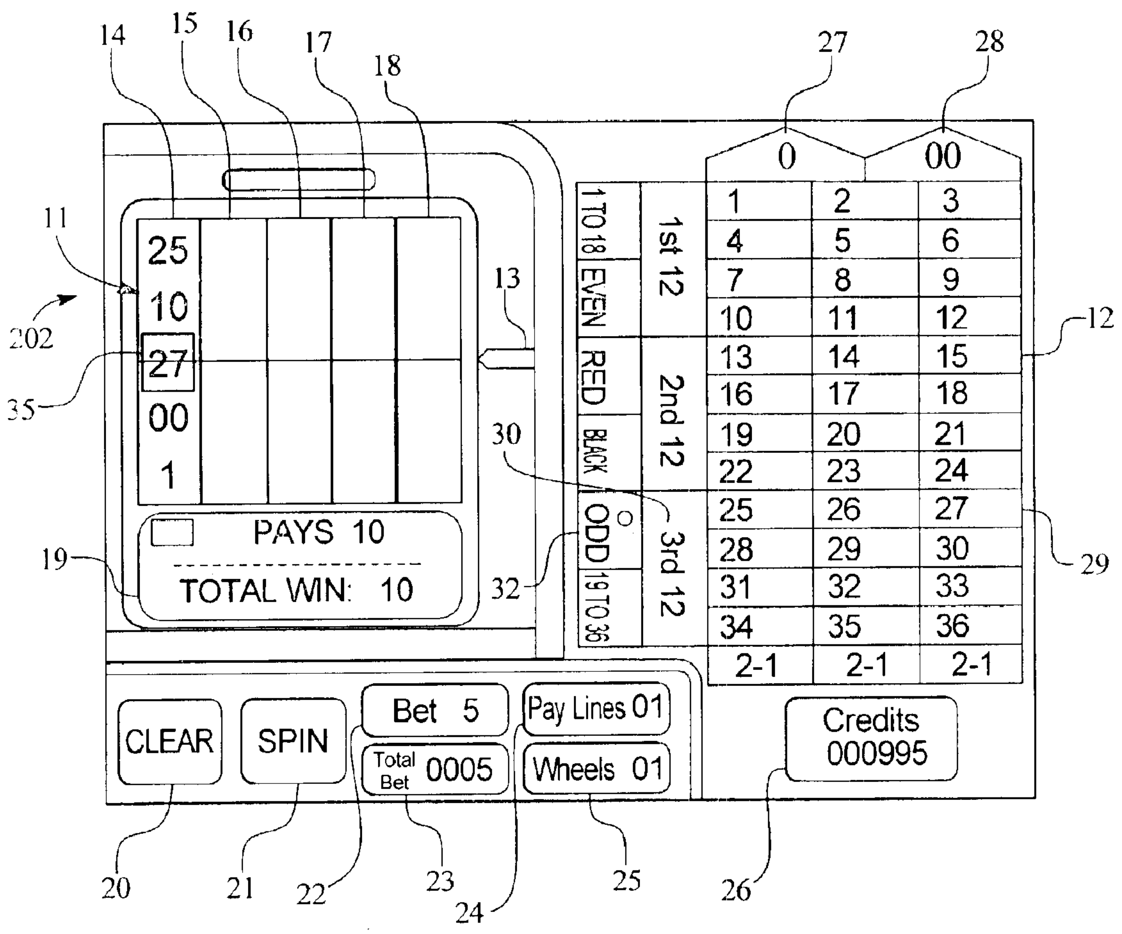
FIG. 4 is an illustration of a second screen display illustrating, among other things, the winning numbers for one roulette wheel with one pay line.

FIG. 4 illustrates the results after the game shown in FIG. 3 was cleared by pressing clear button 20 and the next game was played. In the example shown in FIG. 4, only one roulette wheel 14 and one pay line 13 were selected as shown by displays 25 and 24, respectively. Accordingly, wheels (15–18) are shown as empty. Referring to the betting field 12, the player bet five credits (22) on "odd" (32). Accordingly, the total bet is five credits (as calculated by multiplying the wager (five) times the number of wheels (one) times the number of pay lines (one)), as shown in display 23.

After the wheel 14 is "spun" and the random number generator determines the winning number of 27 (which is an "odd" number) (35), as shown along pay line 13, the winning bets are determined. In this example, the payoff is 2 for 1 for an "odd" bet. As 27 is an "odd" number and the player had bet five credits on "odd" (32), the game pays ten credits, as shown in display 19. The net win is thus ten credits minus the five credits bet, or five credits, which is then added to the total balance to yield 995 credits, as shown in display 26.

Figure 5:
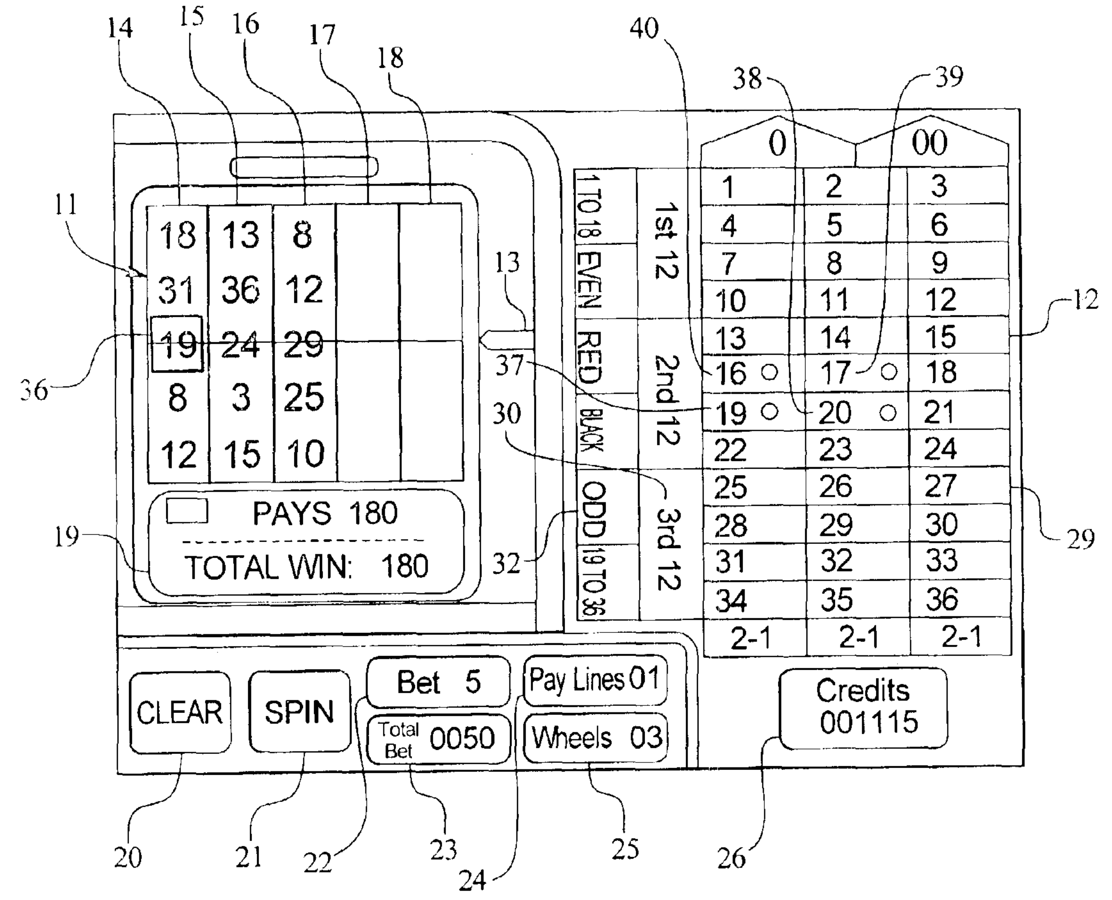
FIG. 5 is an illustration of a third -screen display showing, among other things, the winning numbers for three roulette wheels with one pay line.

FIG. 5 illustrates the results of an additional game played after the example in FIG. 4. As shown in FIG. 4, three wheels (14–16) and one pay line 13 were selected for the game, as shown in displays 25 and 24. Bets of five credits (22) each were placed on the numbers 16 (40), 17 (39), 19 (37), and 20 (38). This makes for a total bet of five credits times four numbers times three wheels, or sixty credits, as shown in display 23. As shown in the wheel portion 11, the winning numbers from the "spin", as indicated by viewing the pay line 13, are the number 19 (36) from the first wheel 14, the number 24 from the second wheel 15, and the number 29 from the third wheel 16. Because the number 19 (36) was bet on (37), the bet on 19 (37) is a winning bet. As individual number bets normally pay 36 for 1, the total winnings would be thirty-six times five credits (the amount bet) which equals 180 credits, as shown in display 19. Accordingly, the net proceeds to the player would be 180 credits won minus 60 credits lost (the total bet), for a net result of 120 credits won. The net result is then added to the total balance shown in display 26 to indicate that the balance is 1115 credits.

Figure 6:
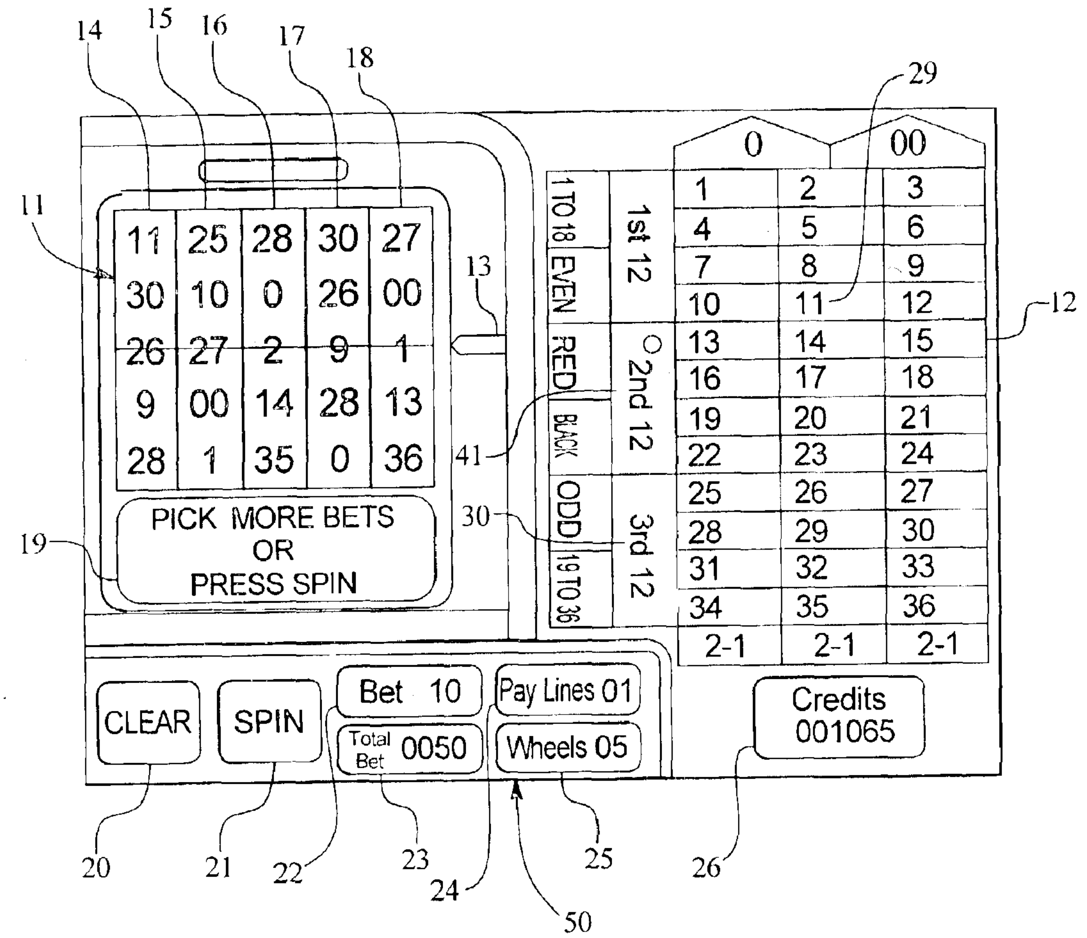
FIG. 6 is an illustration of a fourth screen display illustrating, among other things, five roulette wheels with one pay line.

After completion of the game shown in FIG. 5, the example shown in FIG. 6 illustrates a game where five wheels (14–18) and one pay line 13 are selected, as shown in displays 25 and 24. A ten credit bet is placed on the "2$^{nd}$ 12" (41). The total bet is thus ten credits times five wheels times one pay line, which equals fifty credits, as shown in display 23. Before the game is played, display 19 informs the player to place additional bets or press spin. The player may also change the number of wheels or pay lines desired for the game. In one embodiment, additional bets may be placed by pushing the bet input and display button 22 and selecting a bet on the betting field 12.

By pushing the spin button 21, the wheels are spun. Once the wheels stop spinning, the winning numbers are displayed. As shown in FIG. 6, the winning numbers along pay line 13 are 26, 27, 2, 9 and 1. However, since none of these numbers are within the "$2^{nd}$ 12" (i.e., 13 to 24), the player loses the fifty credit bet in its entirety and the display of remaining credits is updated to indicate the total balance of 1065, as shown in display 26.

Figure 7:
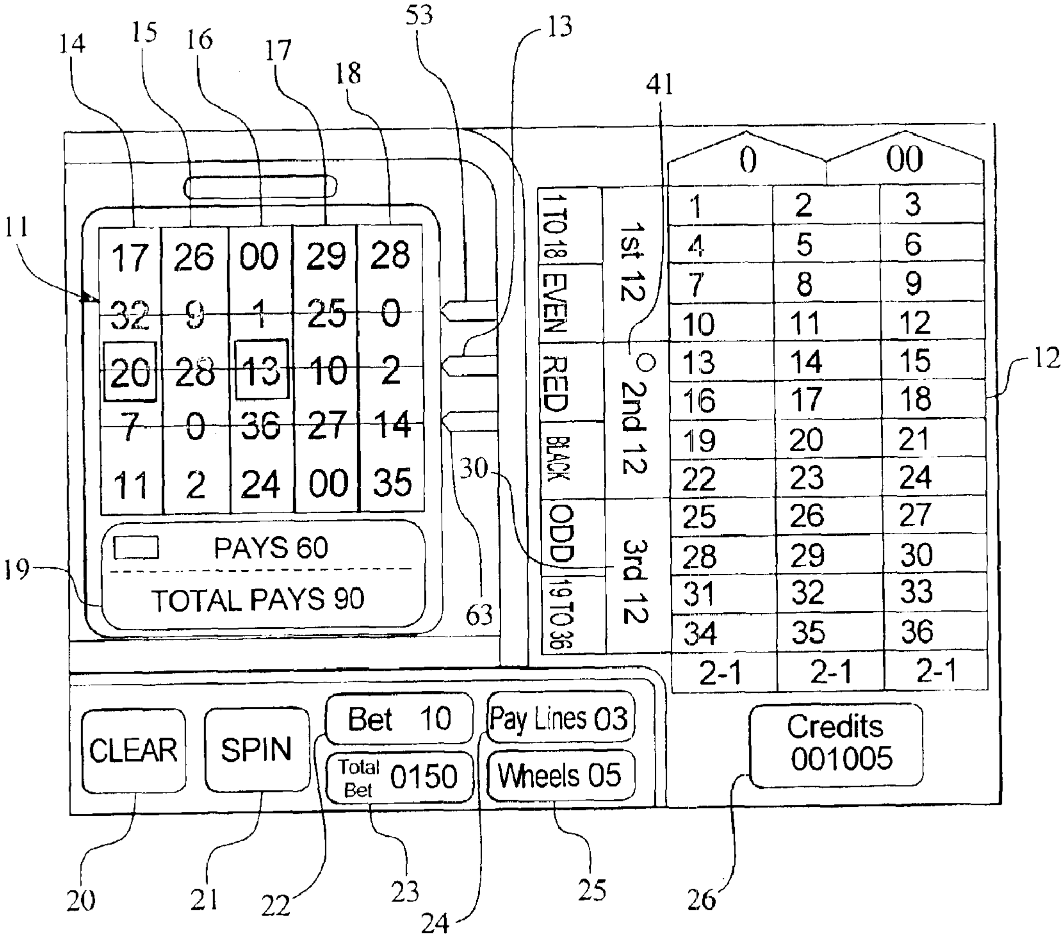
FIG. 7 is an illustration of a fifth screen display showing, among other things, the results of the spin for the second of three pay lines for five roulette wheels.
Figure 8:
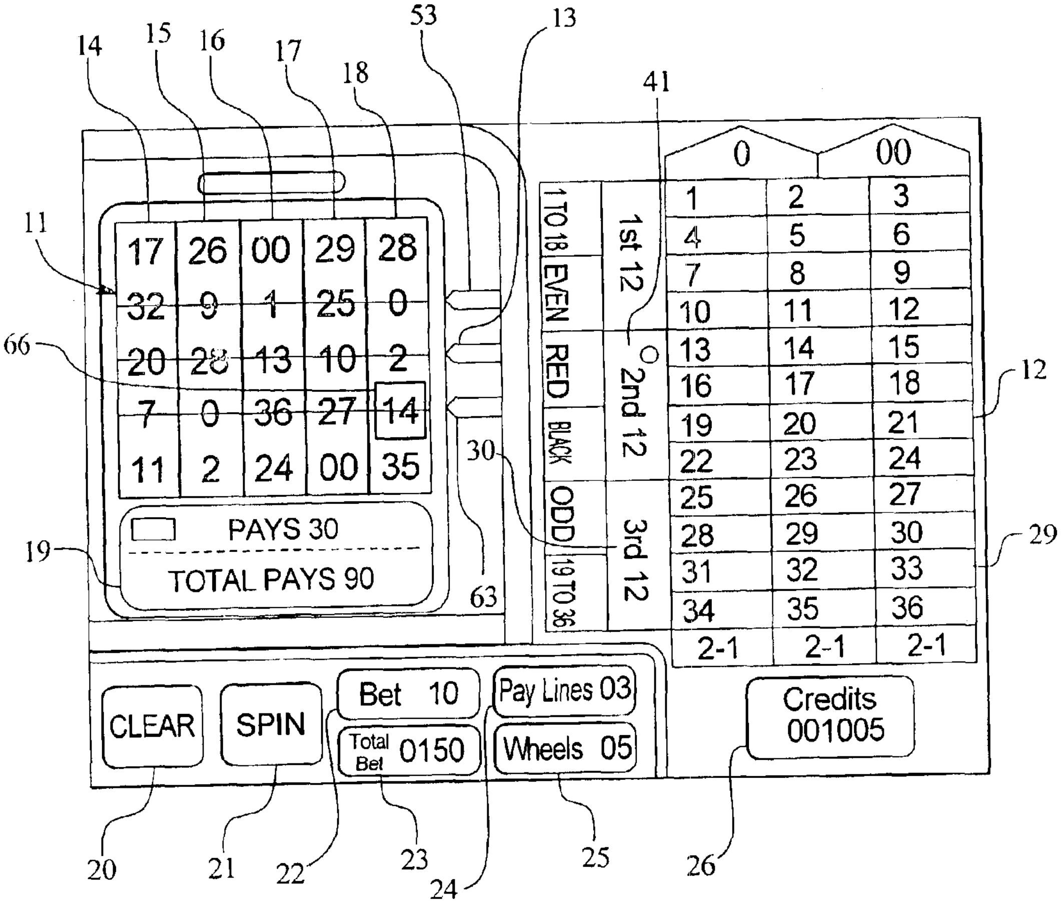
FIG. 8 is an illustration of a sixth screen display showing the results of the spin shown in FIG. 7 for the third pay line for the five roulette wheels.

A five-wheel, three-pay line example is provided in FIGS. 7 and 8. Because there are three pay lines, there are three potential winning numbers per wheel. As shown in the betting field 12, a ten credit bet is placed on "$2^{nd}$ 12" (41). Because there are five wheels (14–18) and three pay lines (53, 13 and 63) the total bet is five times three times ten credits or 150 credits. Because of the bet on "$2^{nd}$ 12" (41), the winning numbers are those numbers between 13 and 24 that appear along one of the pay lines. In this case, such winning numbers include 20 (46) and 13 (56) with respect to wheels 14 and 15, respectively, and middle pay line 13. In addition, as shown in FIG. 8, the number 14 (66) (which is the $4^{th}$ number in the $4^{th}$ wheel (18)) is a winner with respect to the $3^{rd}$ pay line 63. In this example, the odds of a bet on the "$2^{nd}$ 12" are 3 for 1. Accordingly, the total payout is three winning numbers times three times ten credits, which equals 90 credits. Subtracting the amount bet (150 credits) from the amount won (90 credits) in this example therefore equals a net loss of 60 credits, as reflected in display 26, which has been updated to reflect 1005 total credits (which is down from the prior 1065 credits of FIG. 6).

Figure 9:
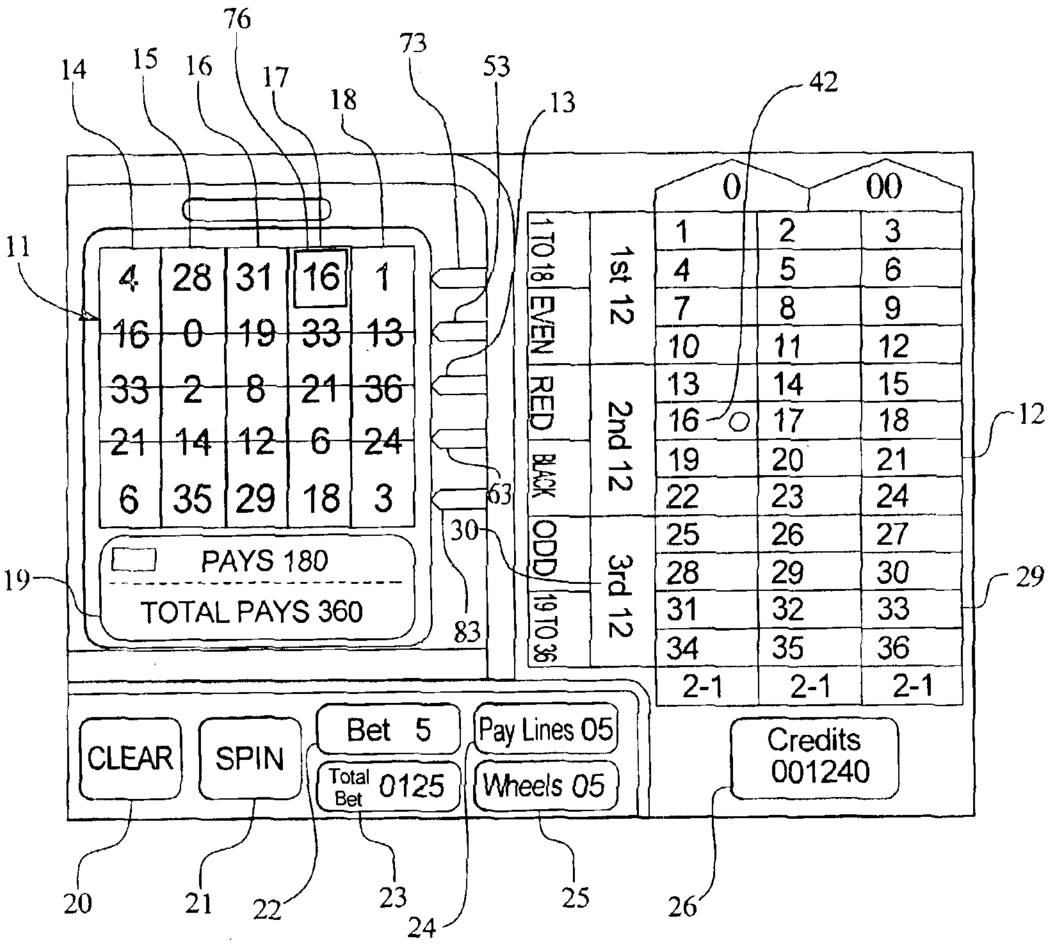
FIG. 9 is an illustration of a seventh screen display illustrating, among other things, the winning numbers for five roulette wheels with five pay lines.

Referring now to FIG. 9, the results of a game are displayed wherein five wheels (14–18) and five pay lines (73, 53, 13, 63 and 83) were selected. As shown in display 22 and betting field 12, a five-credit bet is placed on the number 16 (42). The total bet is five wheels times five pay lines times five credits, which equals 125 credits, as shown in display 23. As indicated above, the wheels may be cleared and spun by pressing buttons 20 and 21.

The result of the 'spin' is that the number 16 (76) comes up as a winning number twice: once along pay line 73 on the $4^{th}$ wheel (17) and once along pay line 53 on the $1^{st}$ wheel (14). Because each individual number "hit" pays 36 for 1, the payout is thirty-six times five credits times two hits, which equals 360 credits. Accordingly, the display 19 shows that each hit of "16" pays 180 credits and that the total win is 360 credits. In the example of FIG. 9, the payout may include a bonus because more than one of the wheels came up with the same winning number on one of the pay lines. Such bonuses can be pre-selected to provide a special payout depending upon how many wheels come up with a specified number as the winning number and winning bet.

For example, a bonus, jackpot, progressive, or other special payout can be made when the outcome includes a particular number selection or one which is repeated a selected number of times on different wheels. For example, a special payout could be made if: a particular "number of the day" or "match number" came up; or, if the same number appeared a particular predetermined number of times on multiple roulette wheels. The special payout could be further constrained to be three adjacent wheels having the same number, or perhaps only the first three wheels. By making it practical for a player to play virtually any number of roulette games simultaneously, the invention allows the creation of these special wheel combination payouts.

The foregoing description of one or more embodiments of the invention have been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims as set forth below.

What is claimed:

1. An electronic roulette game having at least two roulette wheels having multiple numbers for providing an outcome consisting of one or more winning numbers, wherein the game may be played by at least one player who makes at least one roulette bet and seeks a payout when said bet includes a number that matches at least one winning number of said outcome, said game comprising:

- a plurality of activatable reels, each of said reels representing one of the roulette wheels in said roulette game;
- an electronic display for displaying said reels in said roulette game;
- activating means for activating at least one of said reels;
- input means operably associated with said electronic display for entering said at least one roulette bet by said player, wherein said roulette bet includes at least one of the numbers on the reels;
- computer means for controlling the game, said electronic display, said activating means and said input means;
- means for randomly generating an outcome for each of said activated reels, wherein the outcome for each activated reel includes at least one winning number; and
- means for computing said payout based on said roulette bet and said outcomes, wherein the payout is provided to a player when the number associated with the roulette bet matches at least one of the winning numbers of said outcomes.

2. The game according to claim 1 further including multiple winning numbers for each reel.

3. The game according to claim 2 which further includes means for selecting the number of winning numbers for each reel.

4. The game according to claim 1 which further includes means for selecting the number of reels displayed in the game.

5. The game according to claim 1 where the roulette wheels are represented by graphic representations of roulette wheels having multiple numbered slots on a video screen, and at least one of the winning numbers is indicated by the representation of a ball landing in the slot of the winning number.

6. The game according to claim 5 where a plurality of winning numbers per roulette wheel are indicated by the representation of multiple balls falling into a number of winning number slots.

7. The game according to claim 1 wherein the winning numbers on the reels are indicated by at least one pay line associated with said reels.

8. The game according to claim 1 wherein the reels are represented by an electromechanical reels.

9. The game according to claim 1 further including means for wagering on said roulette game.

10. The game according to claim 9 wherein said wagering means further includes means for wagering on multiple reels by making a single betting selection.

11. The game according to claim 10 wherein said electronic display further includes a roulette betting felt layout for making said betting selections.

12. The game according to claim 1 wherein a progressive, jackpot, or bonus payout is made when said outcome includes a number selection, which is, repeated a selected number of times.

13. An electronic roulette game having at least two roulette wheels having multiple numbers for providing an outcome consisting of one or more winning numbers, wherein the game may be played by at least one player who makes at least one roulette bet and seeks a payout when said bet includes a number that matches at least one winning number of the outcome, said game comprising:

a plurality of activatable reels, each of said reels representing one of the roulette wheels in said roulette game;

an electronic display for displaying said roulette game;

input means operably associated with said electronic display for entering said at least one roulette bet by said player wherein said roulette bet includes at least one of the numbers on the reels;

means for selecting the number of winning numbers for said reels;

means for selecting and activating the number of said reels in said game;

computer means for controlling said game, said electronic display and said input means;

means for randomly generating an outcome for each of said activated reels, wherein each activated reel includes said selected number of winning numbers; and means for computing said payout based on said roulette bet and said outcomes wherein the payout is provided to a player when the number associated with the roulette bet matches at least one of the winning numbers of said outcomes of said activated reels.

14. A method for playing an electronic roulette game having at least two roulette wheels having roulette numbers, wherein the game includes means for selecting at least one of said numbers or a combinations of numbers for a bet to attempt to receive a payout when the bet includes a number that matches at least one winning number from the outcome, the method comprising the steps of:

providing a plurality of activatable reels, each of said reels representing one of the roulette wheels in said game;

selecting said roulette bet to be played wherein said roulette bet includes selection of at least one of the roulette numbers;

selecting the number of said reels to be activated in said game;

activating the selected number of reels;

wagering on said selections;

determining said outcome of said activated reels in the form of at least one winning number; and computing the amount of said payout based on said roulette bet and said outcome and providing the payout to a player when at least one of the selected numbers matches the winning number.

15. The method of claim 14 wherein said method further comprises determining the number of winning numbers on each of the activated reels.

16. The method of claim 14 wherein said wagering is made on the selected reels by placing a single wager.

17. The method of claim 14 wherein a bonus payout is provided when said outcome includes a number selection that is repeated a selected number of times as a winning number on said activated reels.

18. The method of claim 17 wherein said bonus payout is a jackpot.

19. The method of claim 18 wherein said bonus payout is a progressive payout.

20. A method of playing at least two roulette wheels at the same time by making at least one roulette bet in an attempt to receive a payout based on the outcome of a game, comprising the steps of:

providing a plurality of activatable reels, each of said reels representing one of the roulette wheels in said game;

selecting said at least one roulette bet to be played on all of said reels, wherein said roulette bet includes selecting at least one number displayed by the reels;

wagering on said at least one roulette bet;

activating at least one of said reels;

randomly generating the outcome in the form of one or more winning numbers for each of said activated reels of said roulette game; and computing the amount of said payout based on said outcome for each of said selected roulette bets for each of said activated reels; and providing the payout to a player when at least one of the selected numbers matches any of the winning numbers.

21. The method of claim 20 which further includes the steps of selecting and activating a number of said reels to be played.

22. The method of claim 20 which further includes the step of selecting the number of winning numbers for each of said activated reels.

23. A gaming device including a game operable upon a wager by a player, said gaming device comprising:

a plurality of activatable reels in the game, each reel including a plurality of symbol positions, a plurality of said symbol positions including numbers representing numbers of a roulette wheel and at least one of said symbol positions including a secondary characteristic;

a plurality of activatable paylines associated with the reels;

a selection display including a plurality of different selections, a plurality of said selections including a different one of the numbers in said symbol positions and at least one of said selections including the secondary characteristic; and a processor operable to:

(a) enable a player to place at least one wager to activate at least one of the paylines and activate at least one of the reels in a play of the game, (b) enable the player to pick at least one of the selections of the selection display for said play of the game, (c) spin the activated reels, (d) determine if the number or the secondary characteristic associated with the picked selection occur on said activated reel and said activated payline in said play of the game, (e) provide an outcome to the player when the picked selection includes at least one of the numbers occurring on said activated reel and said activated payline in said play of the game, and (f) provide an outcome to the player when the picked selection includes at least one of the secondary characteristics occurring on said activated reel and said activated payline in said play of the game.

24. The gaming device of claim 23, wherein one of said symbol positions includes at least one of said numbers and said secondary characteristic.

25. The gaming device of claim 23, wherein said symbol positions include a plurality of different secondary characteristics.

26. The gaming device of claim 25, wherein the secondary characteristics include at least one color, at least one designated group of the numbers and at least one number type.

27. The gaming device of claim 23, wherein the secondary characteristic includes one of the group consisting of: a color, a designated group of the numbers and a number type.

28. The gaming device of claim 23, which includes a plurality of different wagers, wherein at least one of said wagers is associated with each of said selections.

29. The gaming device of claim 23, wherein at least one of said reels includes a simulated reel.

30. The gaming device of claim 23, wherein at least one of said reels includes a electromechanical reel.

31. A method of operating a gaming device comprising:

(a) providing a plurality of activatable reels, each of the reels including a plurality of symbol positions, a plurality of the symbol positions including numbers representing numbers of a roulette wheel and at least one of the symbol positions including a secondary characteristic;

(b) associating a plurality of activatable paylines with the reels;

(c) providing a selection display including a plurality of different selections, a plurality of the selections including a different one of the numbers in the symbol positions and at least one of the selections including the secondary characteristic;

(d) enabling the player to place at least one wager to activate at least one of the paylines and activate at least one of the reels;

(e) enabling a player to pick at least one of the selections;

(f) spinning said activated reel;

(g) determining if the number or the secondary characteristic associated with the picked selection occur on said activated reel and on said activated payline; and (h) providing an outcome to the player when the picked selection includes at least one of the numbers occurring on said activated reel and said activated payline in said play of the game, and (i) providing an outcome to the player when the picked selection includes at least one of the secondary characteristics occurring on said activated reel and said activated payline in said play of the game.

32. The method of claim 31, wherein one of said symbol positions includes at least one of said numbers and said secondary characteristic.

33. The method of claim 31, wherein said symbol positions include a plurality of different secondary characteristics.

34. The method of claim 33, which includes selecting the secondary characteristics from a plurality of secondary characteristics in the group consisting of: at least one color, at least one designated group of the numbers and at least one number type.

35. The method of claim 31, which includes selecting the secondary characteristic from the group consisting of: a color, a designated group of the numbers and a number type.

36. The method of claim 31, which includes providing a plurality of different wagers and associating at least one of said wagers with each of said selections.

37. The method of claim 31, wherein providing the activatable reels includes providing at least one simulated reel.

38. The method of claim 31, wherein providing the activatable reels includes providing at least one electromechanical reel.

* * * * *